(12) United States Patent
Shin et al.

(10) Patent No.: US 9,203,554 B2
(45) Date of Patent: Dec. 1, 2015

(54) APPARATUS AND METHOD FOR SUPPORTING DISTRIBUTED SPATIAL MULTIPLEXING AND DISTRIBUTED SPATIAL DIVERSITY IN MULTI-HOP RELAY SYSTEM

(75) Inventors: Oh-Soon Shin, Suwon-si (KP); Jong-Hyeuk Lee, Anyang-si (KR); Joo-Hyun Lee, Suwon-si (KR); Sang-Boh Yun, Seongnam-si (KR); Young-Hoon Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1762 days.

(21) Appl. No.: 11/853,967

(22) Filed: Sep. 12, 2007

(65) Prior Publication Data

US 2008/0062909 A1 Mar. 13, 2008

(30) Foreign Application Priority Data

Sep. 12, 2006 (KR) ........................ 10-2006-0087981

(51) Int. Cl.
*H04L 1/00* (2006.01)
*H04B 7/02* (2006.01)
*H04L 1/06* (2006.01)
*H04L 25/03* (2006.01)
*H04L 27/26* (2006.01)

(52) U.S. Cl.
CPC .............. *H04L 1/0041* (2013.01); *H04B 7/022* (2013.01); *H04B 7/026* (2013.01); *H04L 1/0045* (2013.01); *H04L 1/0065* (2013.01); *H04L 1/0071* (2013.01); *H04L 1/0618* (2013.01); *H04L 25/03292* (2013.01); *H04L 27/2626* (2013.01); *H04L 27/2647* (2013.01); *H04L 2001/0097* (2013.01)

(58) Field of Classification Search
USPC ................ 370/208, 279, 315, 316, 492, 501; 375/240.1, 262; 455/12.1, 552.1; 714/751, 755
See application file for complete search history.

(56) References Cited

U.S. PATENT DOCUMENTS

| | | | | |
|---|---|---|---|---|
| 6,512,749 | B1 * | 1/2003 | Wright et al. ................. | 370/316 |
| 6,697,985 | B1 * | 2/2004 | Ilani .............................. | 714/751 |
| 6,839,007 | B2 * | 1/2005 | Zhao et al. ...................... | 341/94 |
| 7,555,035 | B2 * | 6/2009 | Shi et al. ........................ | 375/211 |
| 2005/0014464 | A1 * | 1/2005 | Larsson ....................... | 455/11.1 |
| 2006/0115015 | A1 * | 6/2006 | Oh et al. ....................... | 375/267 |
| 2006/0195752 | A1 * | 8/2006 | Walker et al. ................. | 714/748 |
| 2007/0098110 | A1 * | 5/2007 | Schmidt ........................ | 375/298 |
| 2007/0140292 | A1 * | 6/2007 | Sestok et al. .................. | 370/465 |
| 2007/0160014 | A1 * | 7/2007 | Larsson ........................ | 370/338 |
| 2007/0298789 | A1 * | 12/2007 | Murali et al. .................. | 455/434 |
| 2008/0075033 | A1 * | 3/2008 | Shattil ........................... | 370/328 |

FOREIGN PATENT DOCUMENTS

| | | |
|---|---|---|
| KR | 10-0678048 A | 6/2006 |
| KR | 10-2006-0085130 A | 7/2006 |

* cited by examiner

*Primary Examiner* — Hassan Phillips
*Assistant Examiner* — Saba-Tsegaye
(74) *Attorney, Agent, or Firm* — Jefferson IP Law, LLP

(57) ABSTRACT

An apparatus and method for performing distributed spatial multiplexing and distributed spatial diversity in a multi-hop relay system are provided. In the multi-hop relay system, a transmitter includes an outer coder for performing outer coding on transmission data, an outer interleaver for interleaving data received from the outer coder, an inner coder for dividing data received from the outer interleaver into a plurality of frames and performing inner coding on the divided frames, and a transmitting unit for transmitting hierarchically coded frames received from the inner coder to respective Relay Stations (RSs).

25 Claims, 14 Drawing Sheets

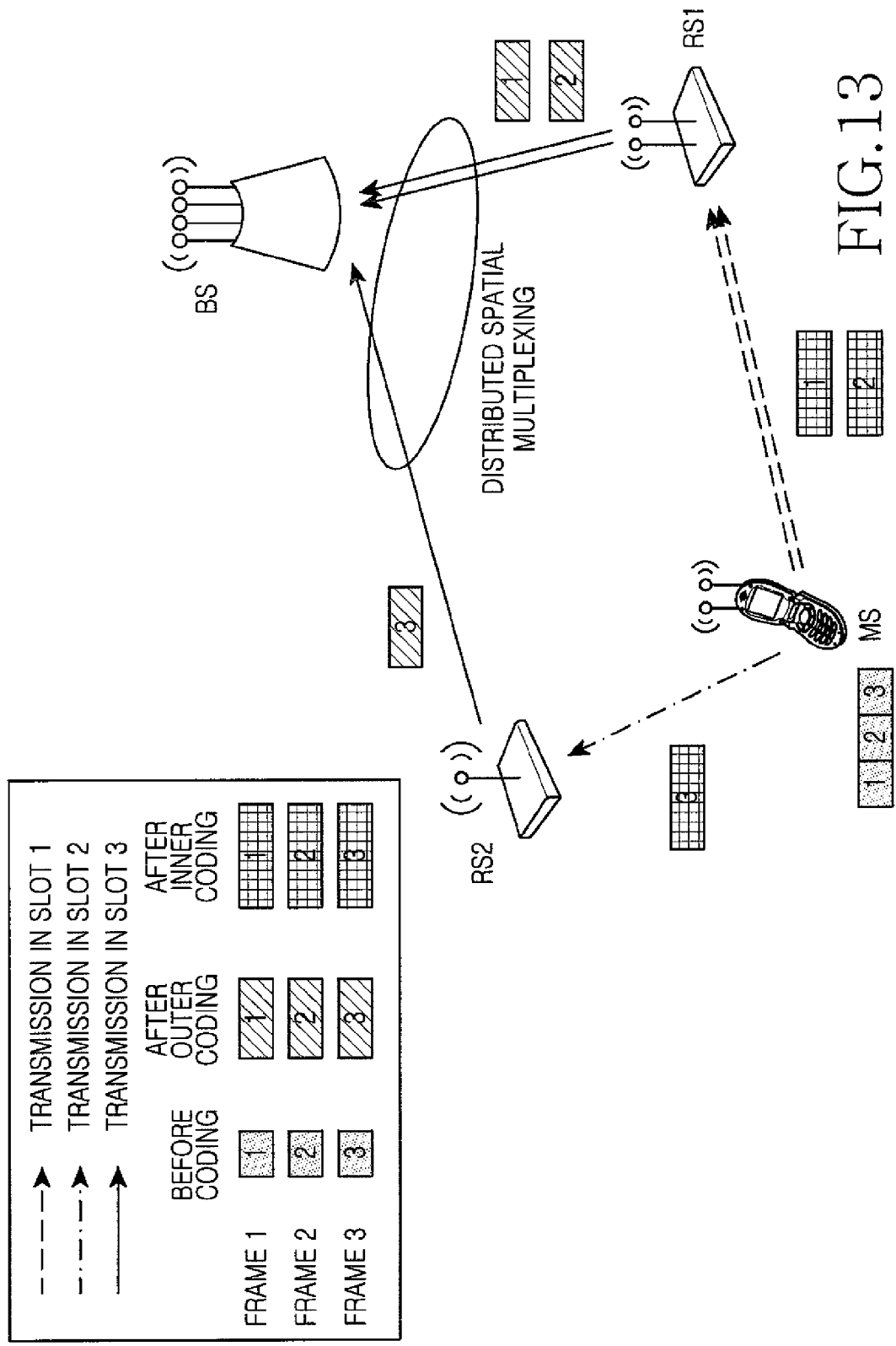

APPARATUS AND METHOD FOR SUPPORTING DISTRIBUTED SPATIAL MULTIPLEXING AND DISTRIBUTED SPATIAL DIVERSITY IN MULTI-HOP RELAY SYSTEM

PRIORITY

This application claims the benefit under 35 U.S.C. §119 (a) of a Korean patent application filed in the Korean Intellectual Property Office on Sep. 12, 2006 and assigned Serial No. 2006-0087981, the entire disclosure of which is hereby incorporated by reference.

BACKGROUND OF THE INVENTION

1. Field of the Invention

The present invention relates to a cellular system using multi-hop relaying. More particularly, the present invention relates to an apparatus and method for supporting distributed spatial multiplexing and distributed spatial diversity.

2. Description of the Related Art

In order to provide a throughput higher than that provided by a 3rd Generation (3G) mobile communication system and to extend a service coverage area, there is a demand for development of a new 4th Generation (4G) mobile communication system. Thus, a competition on developments of a 4G standard is taking place in many research centers and businesses in technologically advanced countries.

The 4G mobile communication system which operates in a high frequency region experiences constraint in a throughput and a service coverage area due to a high path loss. To address such problems, researches based on a multi-hop signal transmission method are being conducted in recent years. According to a multi-hop technique, a path loss can be reduced when a Relay Station (RS) is used to relay data, and thus high speed data communication can be achieved. Furthermore, the service coverage area can be extended since a signal can be transmitted even when a Mobile Station (MS) is located far away from a Base Station (BS).

As such, in a multi-hop relay system, at least one RS is provided to relay data between a transmitter and a receiver. In a cellular system, the RS may be provided separately from the BS and the MS, or one MS may act as an RS with respect to another MS. Communications between two nodes in the multi-hop relay system may be achieved though a direct wireless link, i.e., a transmitter-RS link, an RS-RS link, an RS-receiver link and the like.

FIG. 1 illustrates a path for transmitting one frame in a conventional multi-hop relay system by using N−1 RSs.

Referring to FIG. 1, N resource units are used in the transmission of one frame. The resource units can be represented along the time axis or the frequency axis. For convenience of explanation, it will be assumed hereinafter that the resource units are represented using time slots. In a slot 1, a transmitter transmits a frame 1 to an RS1. In a slot N−1, an RS N−2 transmits the frame 1 received in its previous slot to an RS N−1. In a slot N, the RS N−1 transmits the frame 1 received in its previous slot to a receiver.

A multi-hop relay scheme may use either an Amplify & Forward method or a Decode & Forward method. In the Amplify & Forward method, an RS amplifies a Radio Frequency (RF) signal received from a transmitter, and then the RF signal is relay-transmitted to a receiver. An implementation of this method is simple, but noise enhancement is a problem because noise is also amplified when the RS amplifies the RF signal. On the other hand, in the Decode & Forward method, an RS demodulates and decodes a received signal, and then modulates and encodes the signal to be relayed. In comparison with the Amplify & Forward method, the Decode & Forward method has a demerit in that implementation is complex and error propagation may be frequent. However, the error propagation problem can be addressed when a link control protocol is properly designed, and thus the Decode & Forward method is advantageous over the Amplify & Forward method in terms of flexible technological scalability. A selection relaying protocol and an incremental relaying protocol are typical examples of a link control protocol combined with the Decode & Forward method.

Recently, as an advanced Decode & Forward method, a cooperation diversity technique has been introduced in which the concept of transmit antenna diversity is applied to the multi-hop relay scheme. In this technique, direct communication between a transmitter and a receiver is combined with multi-hop communication, and a plurality of signal transmission paths are formed between the transmitter and the receiver so that a diversity gain can be obtained together with a gain resulted from multi-hop transmission. This technique may be applied to a Distributed Spatial Diversity (DSD) system since a transmitter and an RS have multiple antennas which are spatially distributed and through which signals are transmitted. Therefore, a transmission diversity technique such as Space-Time Coding (STC) is needed to obtain a diversity gain.

FIG. 2 illustrates a path for transmitting one frame in a conventional DSD system.

Referring to FIG. 2, in a slot 1, a transmitter transmits a frame 1 to an RS 1. In a slot 2, the transmitter and the RS 1 transmit STC signals to an RS 2. In a slot N, the transmitter and RSs 1 to N−1 simultaneously transmit STC signals to a receiver. As a result, a diversity gain is obtained.

The multi-hop relay technique and the DSD technique, each of which use the aforementioned Amplify & Forward method or Decode & Forward method, are used under the premise that a transmission time and a reception time are different. In general, in a hardware implementation, an RS cannot simultaneously transmit and receive data using the same frequency band since transmission signal power is significantly greater than reception signal power. Therefore, an additional wireless resource has to be allocated for communication of a transmitter-RS link and an RS-RS link. This is a serious overhead when data is transmitted to the receiver. Thus, in the multi-hop relay and DSD techniques, data can be transmitted more reliably than when data is directly transmitted between the transmitter and the receiver, whereas throughput deterioration occurs due to the aforementioned overhead. For example, when one RS is used, if data is transmitted with a constant throughput via a transmitter-RS link and an RS-receiver link, the throughput may be 50% of the case when data is directly transmitted between the transmitter and the receiver.

The aforementioned problem of the throughput deterioration may be reduced when using an adaptive modulation technique. However, implementation thereof is complex because channel information has to be fed back from one node to another and because of complex signaling. According to the distributed spatial multiplexing, the throughput deterioration problem can be solved by using a multiplexing technique instead of using a diversity scheme for a geographically distributed antenna. That is, when it is allowed for a transmitter and one or more RSs to be able to simultaneously transmit different data, and when a receiver having multiple antennas can detect the different data by performing Multi-Input Multi-Output (MIMO) detection, then a high throughput can be achieved.

FIG. 3 illustrates a path for transmitting N frames in a conventional distributed spatial multiplexing system.

Referring to FIG. 3, in a slot 1, a transmitter transmits a frame 1 to an RS 1. Then, the RS 1 detects the frame 1 and stores it in its buffer. In a slot 2, the transmitter transmits a frame 2 to an RS 2, and the RS 2 detects the frame 2 and stores it in its buffer. Likewise, such process is performed by N−1 times so that a total of N−1 RSs can store different frames. Finally, in a slot N, the transmitter transmits a frame N, and the N−1 RSs simultaneously transmit the different frames stored in their buffers. As a result, N frames are transmitted during N slots, and thus it is possible to provide the same throughput as direct transmission.

Consequently, in the DSD technique, spatial diversity can be obtained by transmitting the same frame through several relay paths using the STC. However, disadvantageously, the DSD technique experiences throughput deterioration as N times as that of the direct transmission. On the other hand, in the distributed spatial multiplexing technique, the same throughput as the direct transmission can be obtained when different frames are transmitted through different relay paths and are detected by performing MIMO detection in a receiver. However, the distributed spatial multiplexing technique has a demerit in that diversity effect cannot be expected.

Accordingly, there is a need for a method capable of supporting advantageous functions of the two techniques. In other words, a new scheme is demanded whereby a diversity gain of the DSD technique and a high throughput of the distributed spatial multiplexing technique are both achieved.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting a diversity gain of a distributed spatial diversity technique and a high throughput of a distributed spatial multiplexing technique in a multi-hop relay system.

Another aspect of the present invention is to provide an apparatus and method in which a frame is generated using a hierarchical coding scheme in a multi-hop relay system and the generated frame is transmitted using a distributed spatial multiplexing technique.

Another aspect of the present invention is to provide an apparatus and method for transmitting transmission information through several relay paths by using a hierarchical coding scheme.

According to an aspect of the present invention, a transmitter in a multi-hop relay system is provided. The transmitter comprises an outer coder for performing outer coding on transmission data, an outer interleaver for interleaving data received from the outer coder, an inner coder for dividing data received from the outer interleaver into a plurality of frames and performing inner coding on the divided frames, and a transmitting unit for transmitting hierarchically coded frames received from the inner coder to respective Relay Stations (RSs).

According to another aspect of the present invention, an RS apparatus in a multi-hop relay system is provided. The RS apparatus comprises a receiving unit for receiving a hierarchically coded frame from a transmitter, an inner decoder for decoding the hierarchically coded frame received from the receiving unit in an inverse manner with respect to an inner coding process performed in the transmitter and thus detecting an outer coded frame, and a transmitting unit for transmitting the outer coded frame to a receiver at a time period.

According to another aspect of the present invention, a receiver in a multi-hop relay system is provided. The receiver comprises a receiving unit for receiving different frames from a transmitter and at least one RS and joining the received frames to output one data block, a de-interleaver for de-interleaving the data block received from the receiving unit in an inverse manner with respect to an interleaving process performed in the transmitter and thus restoring positions of symbols, and a decoder for decoding the data received from the de-interleaver in an inverse manner with respect to a coding process performed in the transmitter.

According to another aspect of the present invention, a communication method of a transmitter in a multi-hop relay system is provided. The communication method comprises performing outer coding on data to be transmitted, performing outer interleaving on the outer coded data, dividing the outer interleaved data into a plurality of frames, performing inner coding on the divided frames, and transmitting the inner coded frames to corresponding RSs.

According to another aspect of the present invention, a communication method of an RS in a multi-hop relay system is provided. The communication method comprises receiving a hierarchically coded frame from a transmitter, decoding the hierarchically coded frame received in an inverse manner with respect to an inner coding process performed in the transmitter and thus detecting an outer coded frame, and transmitting the outer coded frame to a receiver at a time period.

According to another aspect of the present invention, a communication method of a receiver in a multi-hop relay system is provided. The communication method comprises receiving different frames from a transmitter and at least one RS and joining the received frames to output one data block, de-interleaving the data block in an inverse manner with respect to an interleaving process performed in the transmitter and thus restoring positions of symbols, and decoding the de-interleaved data in an inverse manner with respect to a coding process performed in the transmitter.

According to another aspect of the present invention, a communication apparatus in a multi-hop relay system is provided. The communication apparatus comprises a transmitter, having at least one antenna, for interleaving transmission data after performing outer coding, for inner coding the interleaved data by diving it into a plurality of frames, and for transmitting the inner coded frames to corresponding RSs, an RS, having at least one antenna, for inner decoding at least one frame received from the transmitter, and for transmitting to a receiver at least one of the inner decoded frames at a time period, and the receiver, having at least one antenna, for detecting different frames received from the transmitter and the at least one RS, for de-interleaving the detected frames by joining, and for restoring the data transmitted by the transmitter by decoding the de-interleaved data.

BRIEF DESCRIPTION OF THE DRAWINGS

The above and other objects, features and advantages of certain exemplary embodiments of the present invention will become more apparent from the following detailed description when taken in conjunction with the accompanying drawings in which:

FIG. 13 is a view illustrating a scenario when two RSs are installed between an MS (transmitter) and a BS (receiver) in an UL channel of a cellular system according to an exemplary embodiment of the present invention.

The same reference numerals are used to represent the same elements throughout the drawings.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions and constructions will be omitted for clarity and conciseness. Since later-described terms are defined in consideration of the functions of the present invention, they may vary according to users' or operators' intentions or practice. Hence, the terms must be interpreted based on the contents of the entire specification.

An exemplary embodiment of the present invention will be described hereinafter in which a transmitter generates frames by using a hierarchical coding scheme and transmits the generated frames to a receiver by using a distributed spatial multiplexing technique.

An exemplary system of the present invention includes a transmitter in which data is hierarchically coded and transmitted, a total of N−1 Relay Stations (RSs), i.e., RS 1, RS 2, . . . , RS N−1, in which data received from the transmitter is detected, reconfigured, and transmitted to a receiver, and the receiver in which signals received from the transmitter and the RSs are detected by performing MIMO detection and data is then restored. Herein, it will be assumed that the transmitter includes $N_T$ antennas, an RS n includes $M_n$ antennas, and the receiver includes $M_R$ antennas.

Figure 1:
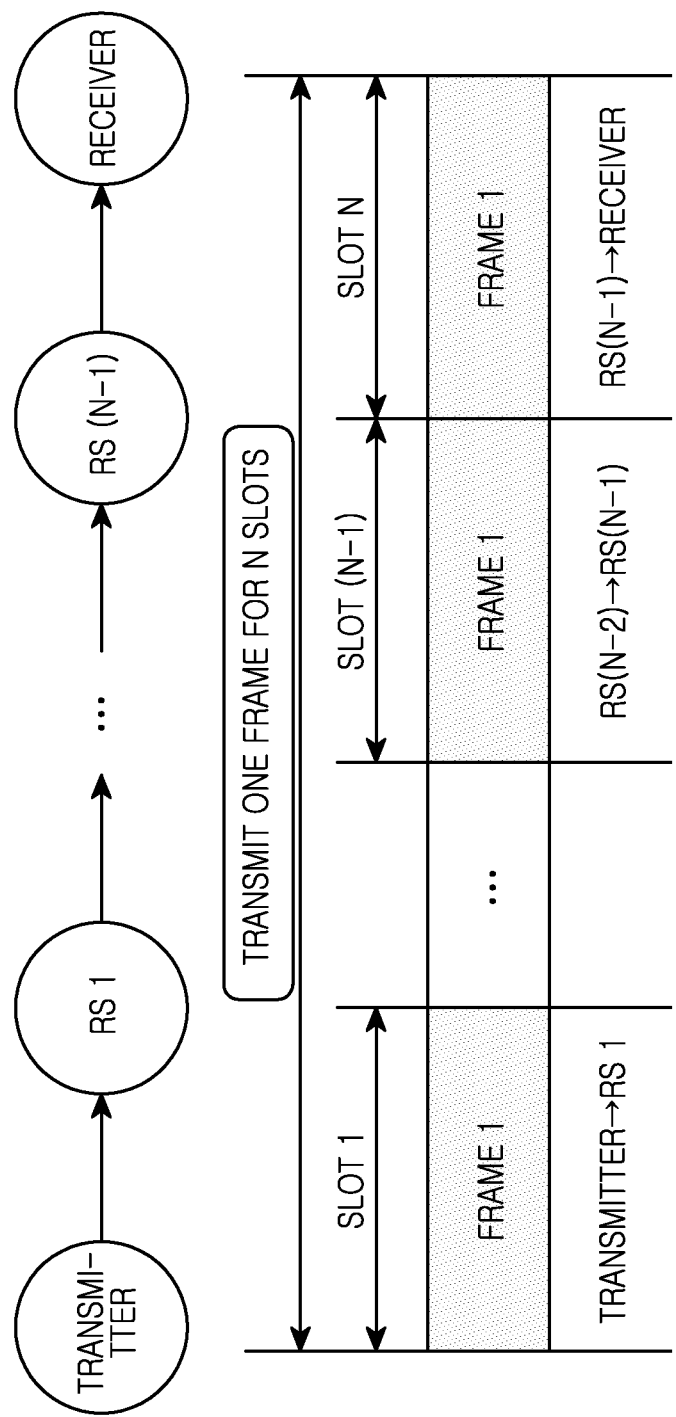
FIG. 1 illustrates a path for transmitting one frame in a conventional multi-hop relay system using N−1 Relay Stations (RSs)
Figure 2:
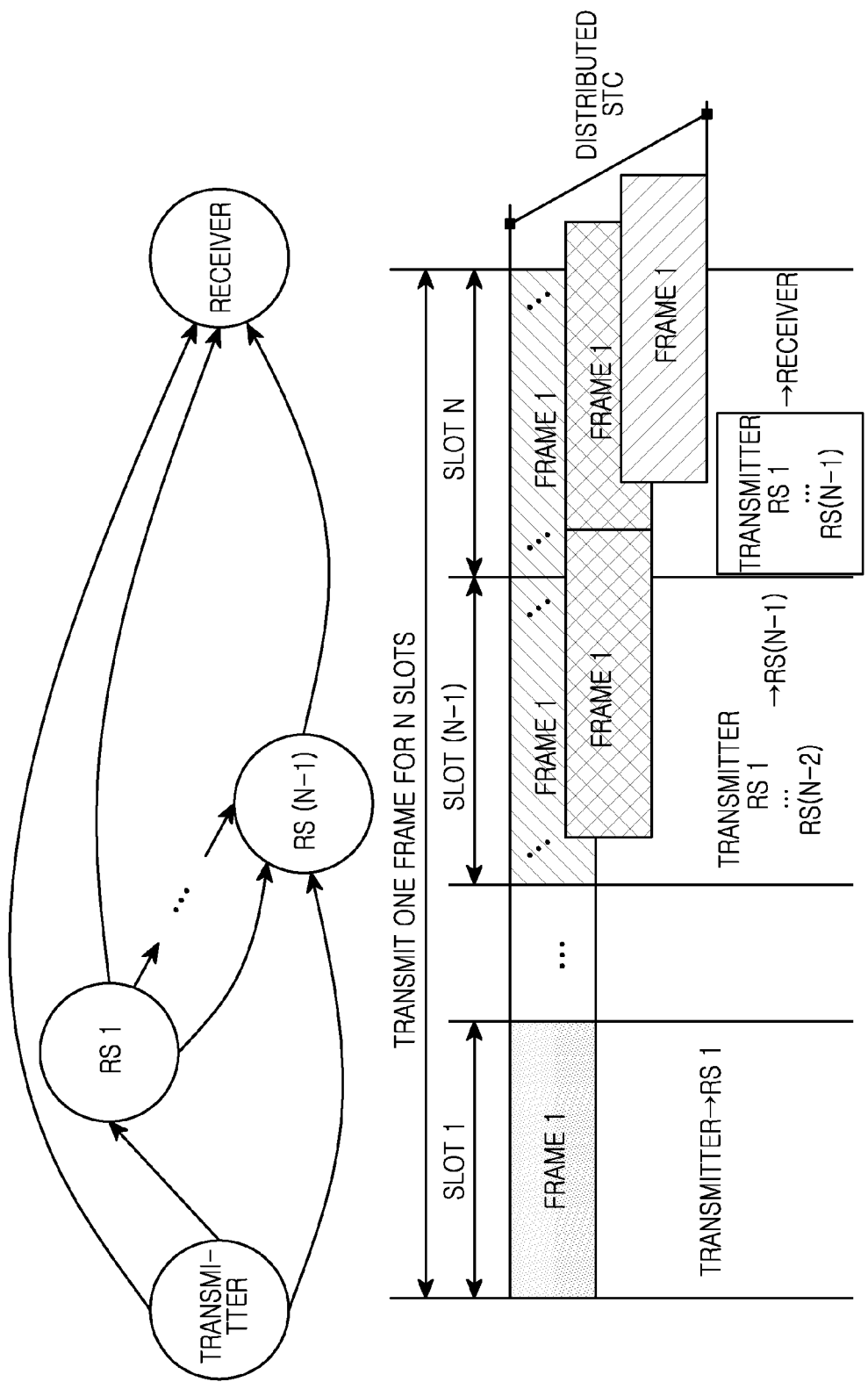
FIG. 2 illustrates a path for transmitting one frame in a conventional Distributed Spatial Diversity (DSD) system.
Figure 3:
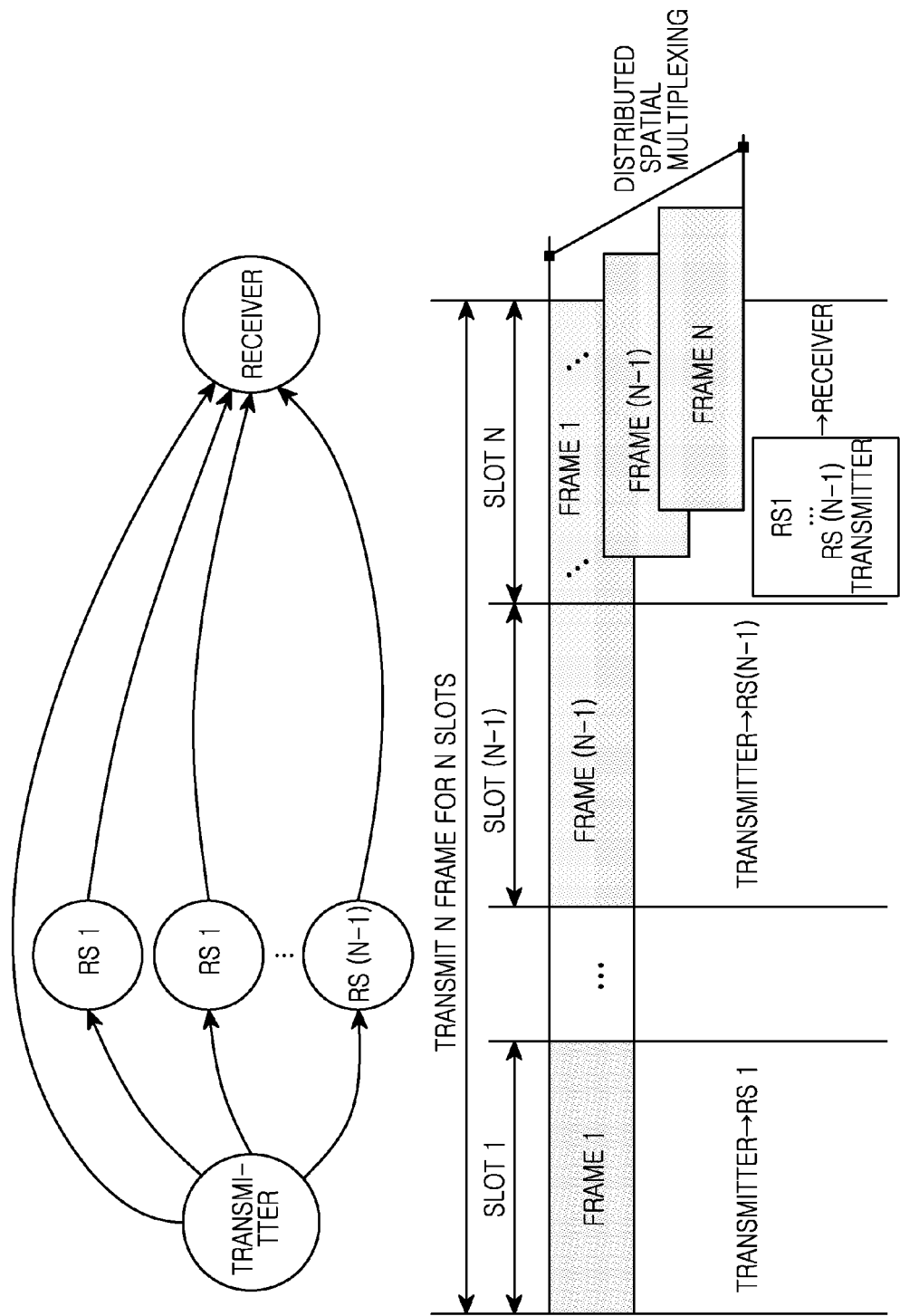
FIG. 3 illustrates a path for transmitting N frames in a conventional distributed spatial multiplexing system.
Figure 4A:
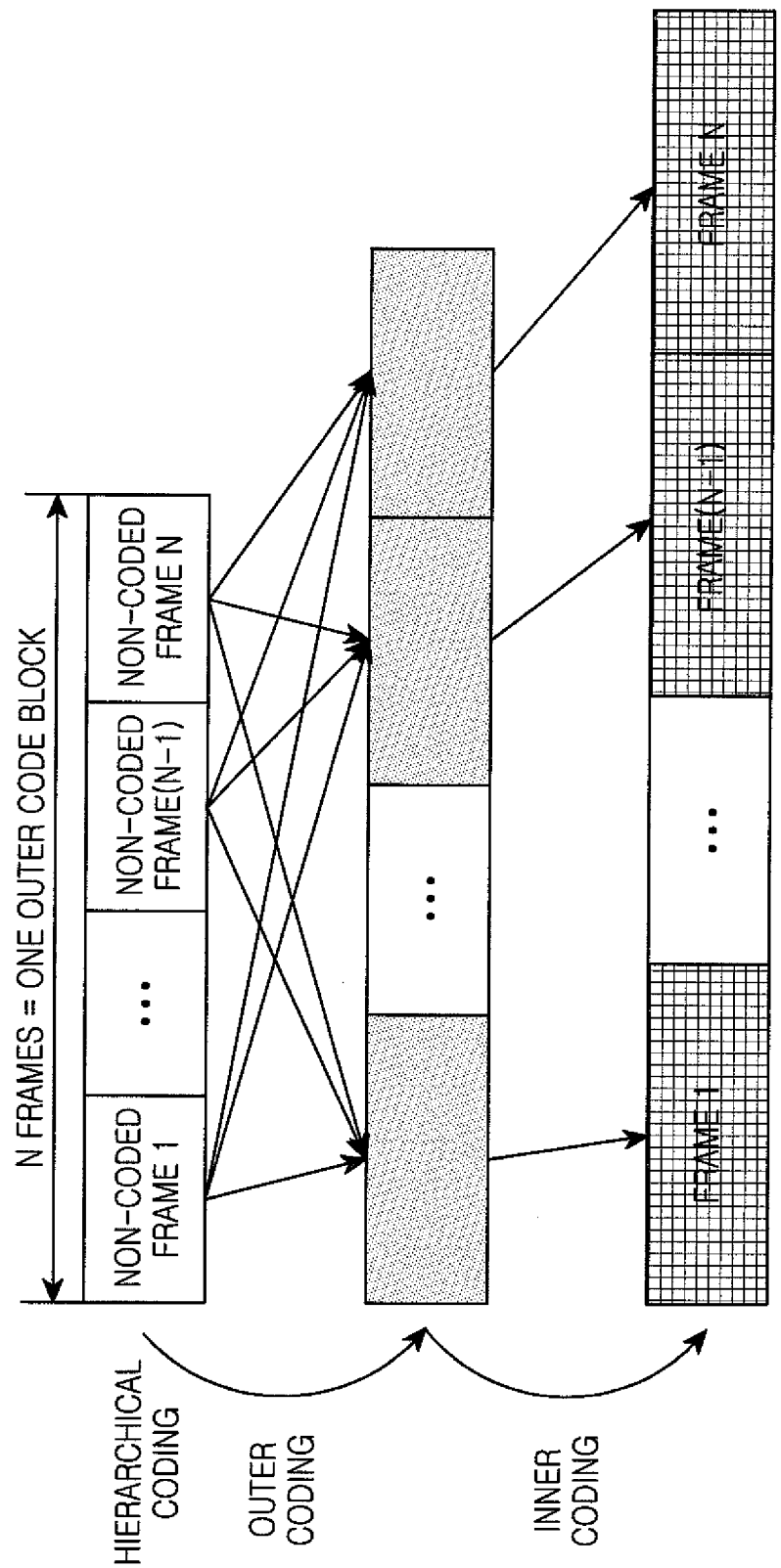
FIGS. 4A and 4B illustrate a path for transmitting a hierarchically coded frame in a multi-hop relay system according to an exemplary embodiment of the present invention.
Figure 4B:
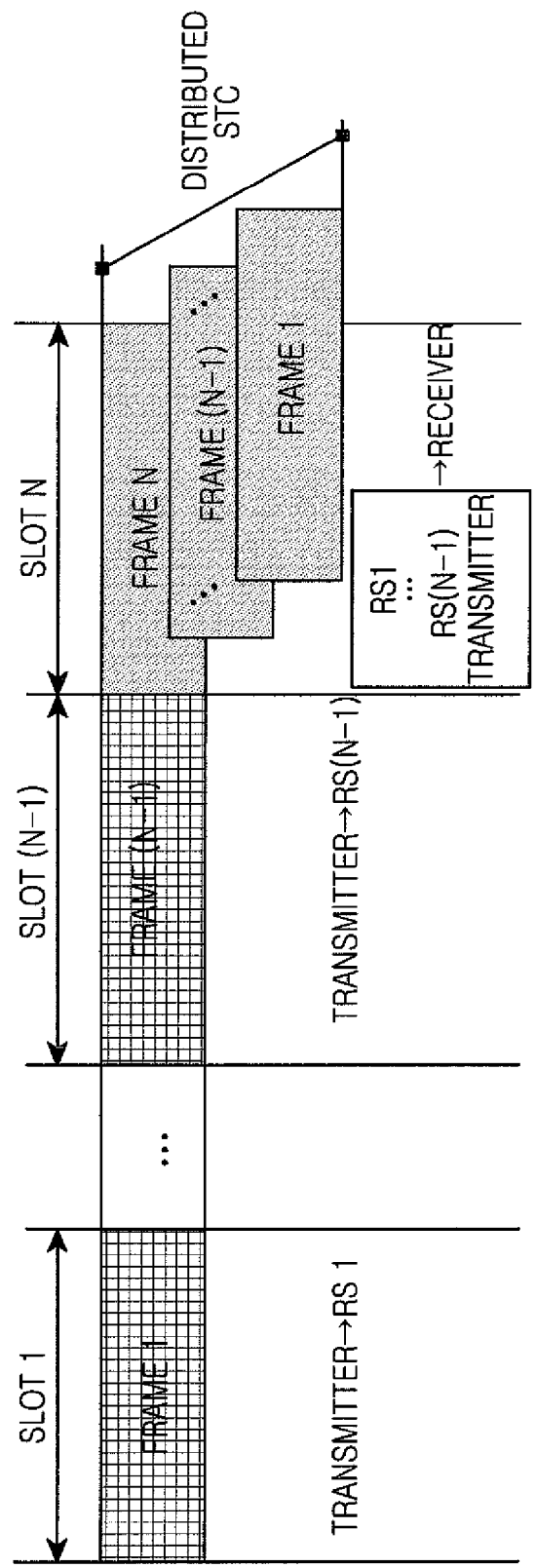

FIGS. 4A and 4B illustrate a path for transmitting a hierarchically coded frame in a multi-hop relay system according to an exemplary embodiment of the present invention.

Referring to FIG. 4A, one outer code block includes N frames. Outer coding is defined as coding combined with interleaving, and as shown in the figure, information on the N frames can be distributed over N slots. The outer coded frames are transmitted to a corresponding RS after inner coding and modulation processes are performed. One outer coded frame is transmitted through a link between two nodes.

Referring to FIG. 4B in a slot 1, a transmitter transmits an outer and inner coded (hierarchically coded) frame 1 to an RS 1. Then, the RS 1 decodes the frame 1 only for the inner coded data, thereby obtaining the outer coded frame 1. Thereafter, the RS 1 stores the resultant outer coded frame 1 in its buffer. Likewise, in a slot 2, the transmitter transmits an outer and inner coded frame 2 to an RS 2. Then, the RS 2 decodes the frame 2 only for the inner coded data, and stores the resultant outer coded frame 1 in its buffer. Such process is repeated by N−1 times, so that N−1 RSs can store different outer coded frames to their buffers. A signal $y_n$ received by an RS n in a slot n can be expressed as Equation (1) below.

$$y_n = h_{Tn}x_n + w_n, \; n=1,2,\ldots,N-1 \qquad (1)$$

Herein, $x_n$ denotes a transmission symbol corresponding to an outer and inner coded frame n, $h_{Tn}$ denotes a channel between a transmitter and an RS n, and $w_n$ denotes a noise signal of the RS n. The RS n performs inner decoding on the symbol $x_n$, and stores an outer decoded signal $\hat{u}_n$ in a buffer.

Finally, in a slot N, the transmitter transmits an outer coded frame N, and the RSs simultaneously transmit the different outer coded frames stored in their buffers. A signal z received by the receiver in the slot N can be expressed as Equation (2) below.

$$z = \sum_{n=1}^{N-1} h_{nR}u_n + h_{TR}\hat{u}_N + w_R \qquad (2)$$

Herein, $h_{nR}$ denotes a channel between an RS n and a receiver, $h_{TR}$ denotes a channel between a transmitter and the receiver, $u_N$ denotes an outer coded signal transmitted by a transmitter, and $w_R$ denotes a noise signal of the receiver.

The receiver restores a data stream $\{\hat{u}_1, \hat{u}_1, \ldots, \hat{u}_{N-1}, u_N\}$ of different frames received from the transmitter and the N−1 RSs by performing MIMO detection.

In an exemplary implementation, it is possible to allow the transmitter and a specific RS not to participate in frame transmission during the slot N. When no frame is transmitted by a total of K nodes in the slot N, the number of frames transmitted during N slots is N−K. This operation will now be described in detail.

For example, when a transmitter and an RS have multiple antennas, a plurality of frames can be transmitted via each link by combining a diversity scheme and a multiplexing scheme. That is, in a slot n, a maximum number of outer and inner coded frames that can be transmitted from the transmitter to an RS n is min($M_T$,$M_n$). In addition, in the slot N, a maximum number of outer coded frames that can be transmitted using the distributed spatial multiplexing scheme is $$\sum_{n=1}^{N-1} \min(M_T, M_n) + M_T.$$

In this case, a total number of frames to be actually transmitted has to be equal to or less the $M_R$.

Now, details of the transmitter, the RS, and the receiver will be described.

Figure 5:
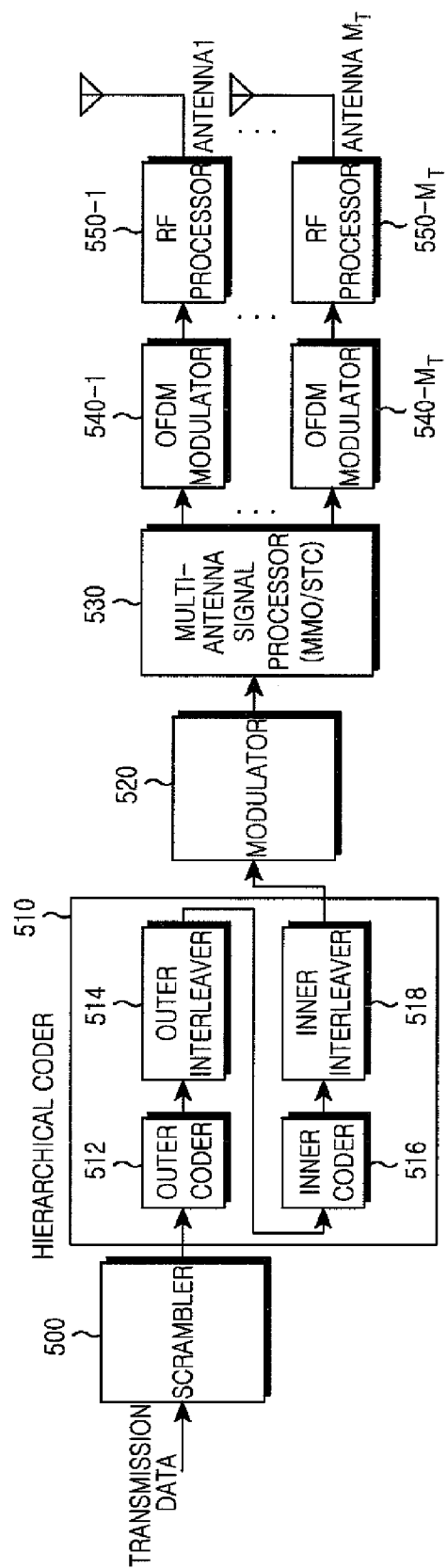
FIG. 5 is a block diagram of a transmitter in a multi-hop relay system according to an exemplary embodiment of the present invention.

FIG. 5 is a block diagram of a transmitter in a multi-hop relay system according to an exemplary embodiment the present invention.

Referring to FIG. 5, the transmitter includes a scrambler 500, a hierarchical coder 510, a modulator 520, a multi-antenna signal processor 530, a plurality of OFDM modulators 540-1 to 540-$M_T$, and a plurality of RF processors 550-1 to 550-$M_T$. The OFDM modulators may be replaced with CDMA modulators according to a user multiple access scheme used. In the following description, an OFDM based Broadband Wireless Access (BWA) system will be explained as an example.

The scrambler 500 scrambles transmission data using a specific code. The hierarchical coder 510 performs outer coding on the specific sized data received from the scrambler 500, divides the data into a plurality of frames, and performing inner coding on the outer coded frames.

Specifically, an outer coder 512 performs outer coding on the data received from the scrambler 500 and thus outputs the data which is divided into a plurality of frames (N frames). For example, the outer coder 512 may be a channel encoder such as a convolutional encoder, a turbo encoder, a Convolutional Turbo Code (CTC) encoder and a Low Density Parity Check (LCPC) encoder. According to a specific rule, an outer interleaver 514 interleaves symbols received from the outer coder 512. The outer interleaver 514 changes positions of the symbols so that the transmission data can be transmitted through several relay paths. An inner coder 516 performs inner coding on frame data received from the outer interleaver 514. A code rate may be determined according to a link state with respect to a corresponding RS. The inner interleaver 518 interleaves frame data received from the inner coder 516 according to a specific rule.

A modulator 520 modulates the symbols coded by the hierarchical coder 510 according to a specific modulation method, and thus generates modulated symbols. Examples of the modulation method include Quadrature Phase Shift Keying (QPSK), 16 Quadrature Amplitude Modulation (QAM), and 32 QAM.

The multi-antenna signal processor 530 performs multi-antenna signal processing on the modulated symbols received from the modulator 520, and thus generates a plurality of antenna signals. To generate the plurality of antenna signals, the multi-antenna signal processor 530 may use a MIMO scheme such as Space Time Coding (STC) and Vertical-Bell Labs Layered Space Time (VBLAST).

The OFDM modulators 540-1 to 540-$M_T$ each perform OFDM modulation on a corresponding antenna signal received from the multi-antenna signal processor 530, and thus generates an OFDM symbol. The OFDM modulation includes Inverse Fast Fourier Transform (IFFT) and Cyclic Prefix (CP) insertion processes.

The RF processors 550-1 to 550-$M_T$ each convert a digital signal received from a corresponding OFDM modulator into an analog signal, convert a baseband analog signal into an RF signal, and transmit the resultant signal through a corresponding antenna.

As shown in FIGS. 4A and 4B, frames generated by the hierarchical coder 510 are outer and inner coded, and then are respectively transmitted to corresponding RSs in corresponding time periods (time slots). Although it has been described that the outer coded data is being divided into a plurality of frames, and the divided frames are inner coded again before transmitted to the RSs and the receiver, an exemplary embodiment of the present invention is not limited thereto. Thus, among the divided frames, at least one frame transmitted to the receiver in a last time slot may be transmitted to the receiver after being subject to only outer coding while skipping inner coding.

Figure 6:
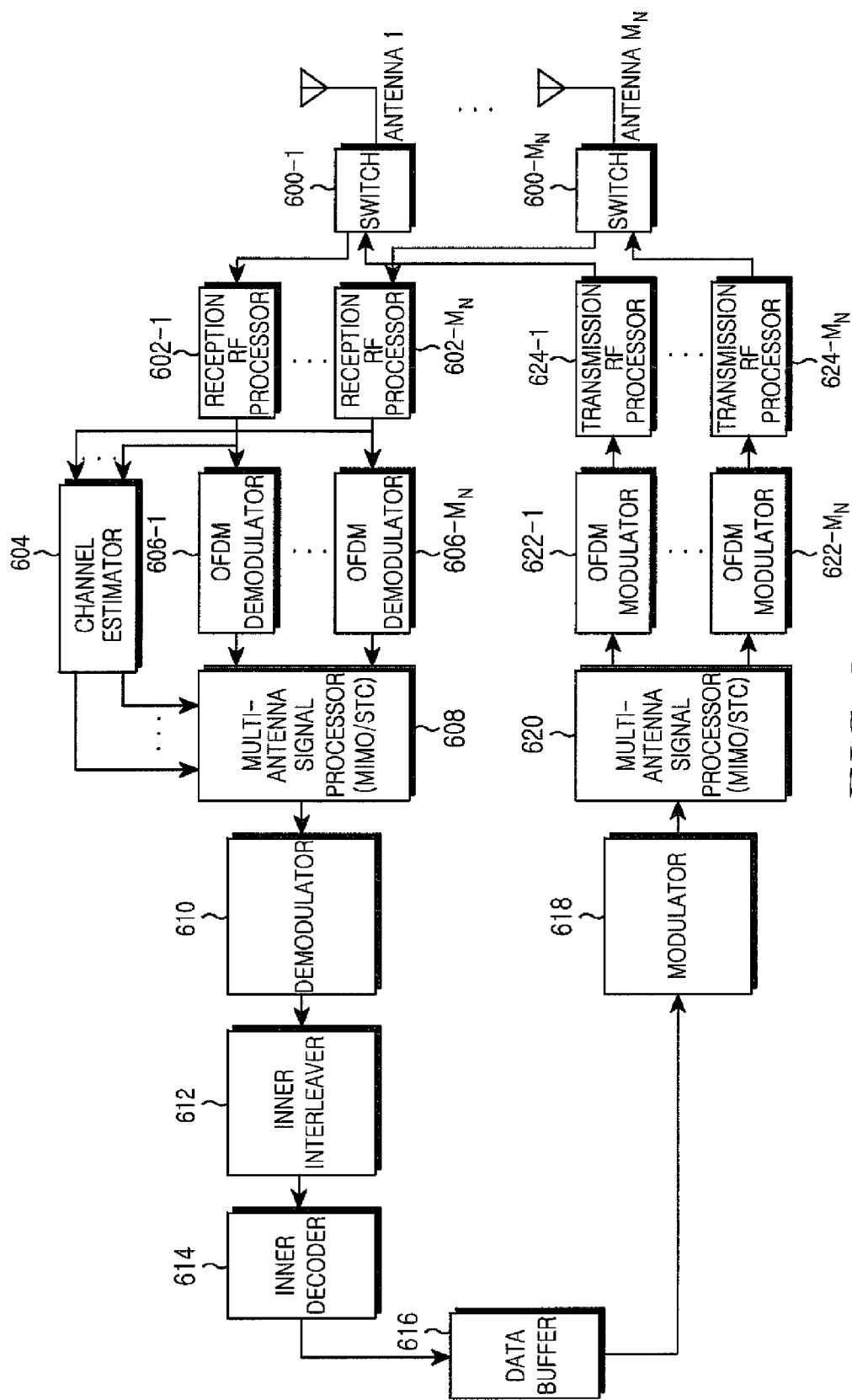
FIG. 6 is a block diagram of an RS in a multi-hop relay system according to an exemplary embodiment of the present invention.

FIG. 6 is a block diagram of an RS in a multi-hop relay system according to an exemplary embodiment the present invention.

Referring to FIG. 6, the RS includes switches 600-1 to 600-$M_n$, reception RF processors 602-1 to 602-$M_n$, OFDM demodulators 606-1 to 606-$M_n$, a channel estimator 604, a multi-antenna signal processor 608, a demodulator 610, an inner interleaver 612, an inner decoder 614, a data buffer 616, a modulator 618, a multi-antenna signal processor 620, OFDM modulators 622-1 to 622-$M_n$, and transmission RF processors 624-1 to 624-$M_n$.

The switches 600-1 to 600-$M_n$ each perform a switching operation between the transmission RF processors 624-1 to 624-$M_n$ and the reception RF processors 602-1 to 602-$M_n$ in a Time Division Duplex (TDD) system. When using a Frequency Division Duplex (FDD) system, these switches have to be replaced with duplexers. The switches 600-1 to 600-$M_n$ each transmit a corresponding antenna signal to a corresponding receiving RF processor during a receiving period, and transmit a signal transmitted from a corresponding transmitting RF processor to a corresponding antenna during a transmitting period.

The reception RF processors 602-1 to 602-$M_n$ each convert an RF signal received through a corresponding antenna into a baseband signal, and convert the baseband analog signal into digital sample data.

The channel estimator 604 estimates synchronization and channel values by using specific signals (e.g., preamble signals) received from the reception RF processors 602-1 to 602-$M_n$, and provides the estimated synchronization and channel values to the multi-antenna signal processor 608. Although it has been described that channel estimation is performed by using a time-domain signal, as well known in the art, the channel estimation may be performed by using a frequency-domain signal. The OFDM demodulators 606-1 to 606-$M_n$ each perform OFDM demodulation on a signal received from a corresponding receiving RF processor, and thus outputs frequency-domain data (sub-carrier value). The OFDM demodulation includes CP removal and FFT operations.

The multi-antenna signal processor 608 demodulates signals received from the OFDM demodulators 606-1 to 606-$M_n$ by performing MIMO detection, and thus generates one data stream. The MIMO detection is performed by using the channel values estimated by the channel estimator 604. The demodulator 610 demodulates the data stream received from the multi-antenna signal processor 608 according to a demodulation method.

The inner interleaver 612 de-interleaves symbols received from the demodulator 610 in an inverse manner with respect to an inner interleaving process performed in the transmitter. The inner decoder 614 decodes symbols received from the inner interleaver 612 in an inverse manner with respect to an inner coding process performed in the transmitter. Resultant output data is outer coded frame data. The outer coded frame data output from the inner decoder 614 is stored in the data buffer 616 before relay-transmitted to the receiver.

The data buffer 616 buffers the outer coded frame data received from the transmitter, and outputs the buffered data when a relay transmission time arrives. The modulator 618 modulates the outer coded frame data received from the data buffer 616 according to a modulation method, and thus generates modulated symbols. Examples of the modulation method include QPSK, 16 QAM, and 32 QAM.

The multi-antenna signal processor 620 performs multi-antenna signal processing on the modulated symbols received from the modulator 618, and thus generates a plurality of antenna signals. To generate the plurality of antenna signals, the multi-antenna signal processor 620 may use a MIMO scheme such as STC and VBLAST.

The OFDM modulators 622-1 to 622-$M_n$ each perform OFDM modulation on a corresponding antenna signal received from the multi-antenna signal processor 620, and thus generate an OFDM symbol. The OFDM modulation includes IFFT and CP insertion processes.

The transmission RF processors 624-1 to 624-$M_n$ each convert sample data received from a corresponding OFDM demodulator into an analog signal, convert the baseband analog signal into an RF signal, and output the resultant signal to a corresponding switch. That is, signals received from the transmission RF processors 624-1 to 624-$M_n$ are transmitted through a plurality of antennas via the switches 600-1 to 600-$M_n$.

As such, the RS decodes only inner coded data contained in the inner and outer coded frame received from the transmitter, thereby obtaining and storing outer coded frame. The stored outer coded frame is then relay-transmitted to the receiver at a time period (time slot).

Figure 7:
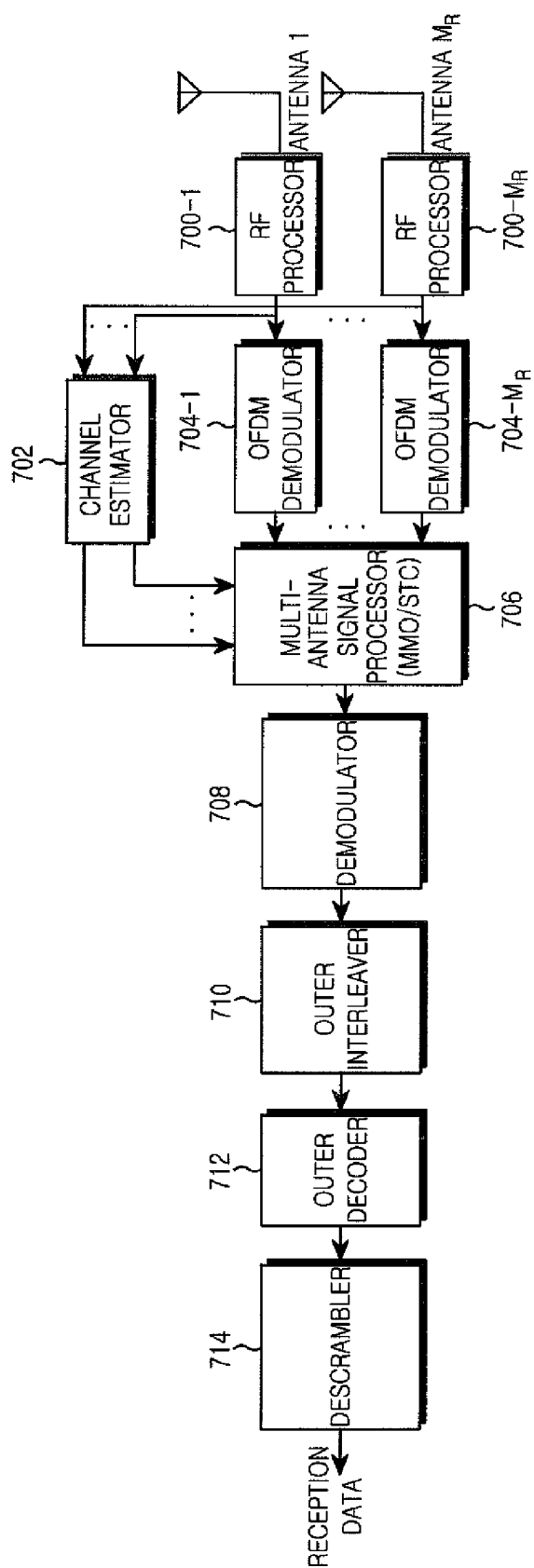
FIG. 7 is a block diagram of a receiver in a multi-hop relay system according to an exemplary embodiment of the present invention.

FIG. 7 is a block diagram of a receiver in a multi-hop relay system according to an exemplary embodiment the present invention. The receiver is a device for receiving frames transmitted from the transmitter of FIG. 5 and frames transmitted from the RS of FIG. 6, by performing MIMO detection.

Referring to FIG. 7, the receiver includes RF processors 700-1 to 700-$M_R$, a channel estimator 702, OFDM demodulators 704-1 to 704-$M_R$, a multi-antenna signal processor 706, a demodulator 708, an outer interleaver 710, an outer decoder 712 and a descrambler 714.

The RF processors 700-1 to 700-$M_R$ each convert an RF signal received through a corresponding antenna into a baseband signal, and convert the baseband analog signal into digital sample data.

The channel estimator 702 estimates synchronization and channel values by using specific signals (e.g., preamble signals) received from the RF processors 700-1 to 700-$M_R$, and provides the estimated synchronization and channel values to the multi-antenna signal processor 706. The OFDM demodulators 704-1 to 704-$M_R$ each perform OFDM demodulation on the signal received from a corresponding RF processor and thus output a sub-carrier value. The OFDM demodulation includes CP removal and FFT processes.

The multi-antenna signal processor 706 demodulates signals received from the OFDM demodulators 704-1 to 704-$M_R$ by performing MIMO detection, detects a plurality of frames, and generates one data steam by joining the frames. Examples of the MIMO detection scheme include Maximum Likelihood (ML), Modified ML (MML), Zero Forcing (ZF) and Minimum Mean Square Error (MMSE). The MIMO detection is performed by using the channel values estimated by the channel estimator 702.

The demodulator 708 demodulates the data stream received from the multi-antenna signal processor 706 according to a demodulation method. The data output from the demodulator 708 is the same as the data output from the outer interleaver 514 of FIG. 5.

The outer interleaver 710 de-interleaves symbols received from the demodulator 708 in an inverse manner with respect to an outer interleaving process performed in the transmitter. The outer decoder 712 decodes the symbols received from the outer interleaver 710 in an inverse manner with respect to an outer coding process performed in the transmitted. Resultant output data is data (estimated data) output from the scrambler 500 of FIG. 5. The descrambler 714 descrambles the data received from the outer decoder 712 using a specific code, and restores the data transmitted from the transmitter.

Figure 8:
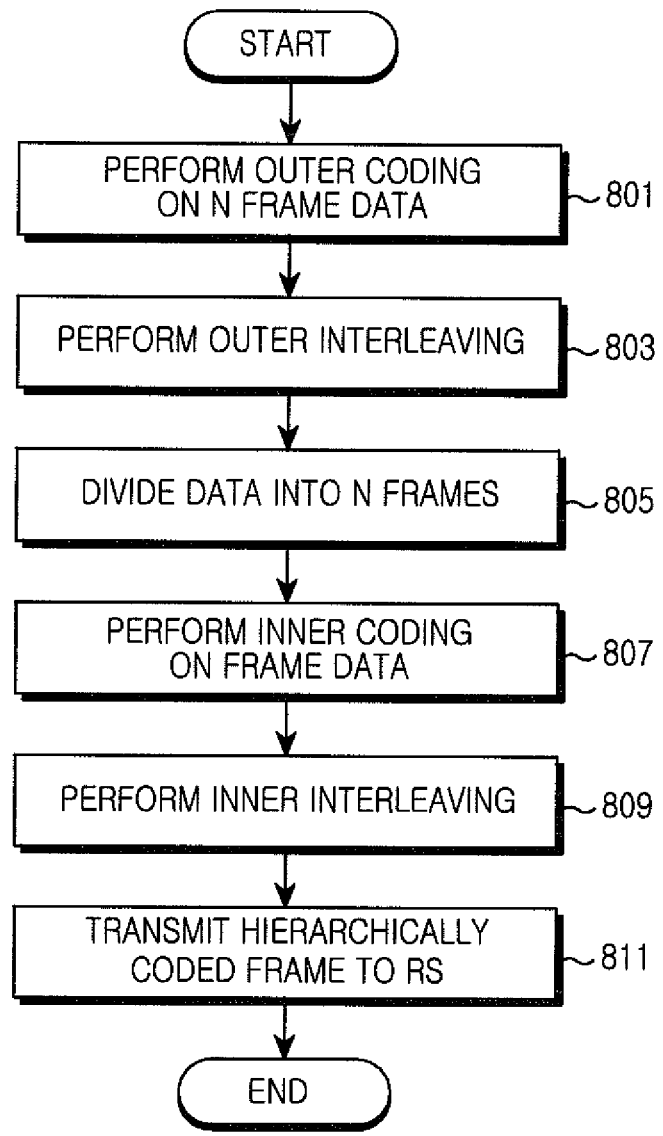
FIG. 8 is a flowchart illustrating an operation of a transmitter in a multi-hop relay system according to an exemplary embodiment of the present invention.

FIG. 8 is a flowchart illustrating an operation of a transmitter in a multi-hop relay system according to an exemplary embodiment the present invention.

Referring to FIG. 8, in step 801, a specific sized (e.g., N frames) data is outer coded according to a coding method. In step 803, the outer coded data is outer-interleaved according to a predetermined rule. The positions of symbols are changed through outer-interleaving so that the transmission data can be transmitted through several relay paths.

After performing the outer-interleaving, in step 805, the outer-interleaved data is divided into N frames. In step 807, the divided frame data is inner coded according to a coding method. In step 809, the inner coded frame data is inner-interleaved according to a predetermined rule.

After performing the inner-leaving, in step 811, the inner-interleaved frame data (hierarchically coded frame data) is transmitted to a corresponding RS in a corresponding time period (time slot). Regarding at least one frame transmitted to the receiver in a last time slot among the divided frames, an outer coded frame may be transmitted to the receiver without performing inner coding.

Figure 9:
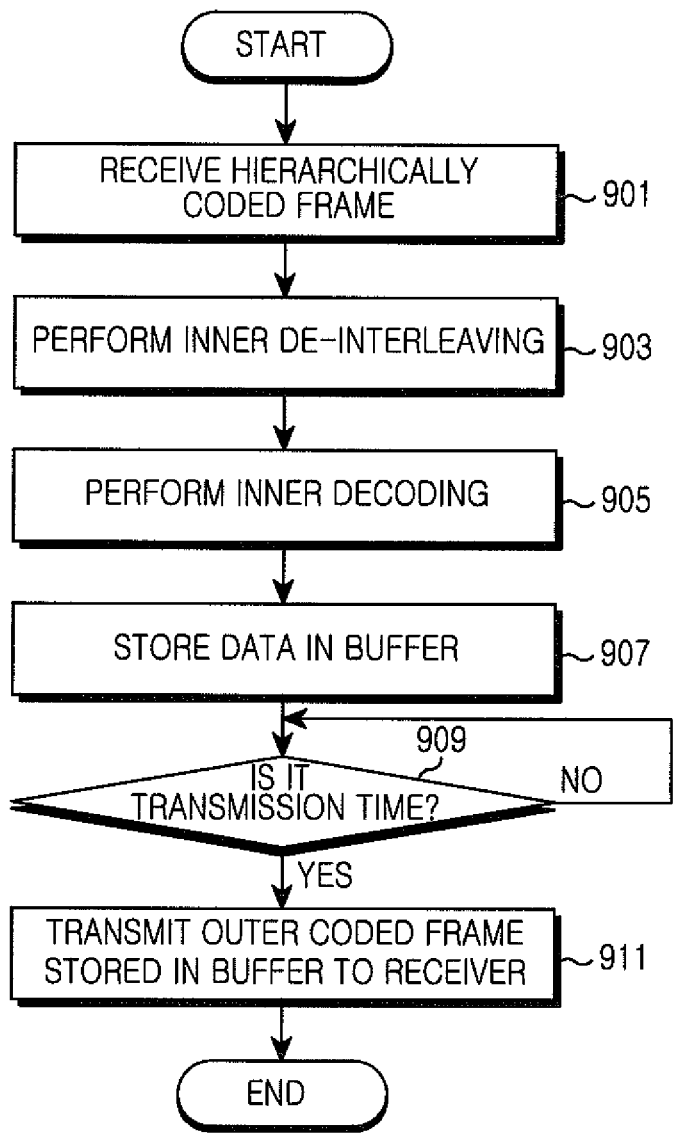
FIG. 9 is a flowchart illustrating an operation of an RS in a multi-hop relay system according to an exemplary embodiment of the present invention.

FIG. 9 is a flowchart illustrating an operation of an RS in a multi-hop relay system according to an exemplary embodiment the present invention.

Referring to FIG. 9, when a corresponding time slot arrives, in step 901, a hierarchically coded frame is received from a transmitter.

Upon receiving the frame from the transmitter, in step 903, the received hierarchically coded frame data is de-interleaved in an inverse manner with respect to an inner interleaving process performed in the transmitter. As such, after performing the inner de-interleaving, in step 905, the inner de-interleaved data is decoded in an inverse manner with respect to an inner coding process performed in the transmitter, thereby detecting an outer coded frame.

In step 907, the outer coded frame is stored in a buffer before it is relay-transmitted to a receiver. In step 909, it is determined whether a relay transmission time has arrived. If it is the relay transmission time, in step 911, the outer coded frame stored in the buffer is transmitted to the receiver. At the same time, the transmitter and other RSs also transmit different outer coded frames to the receiver.

Figure 10:
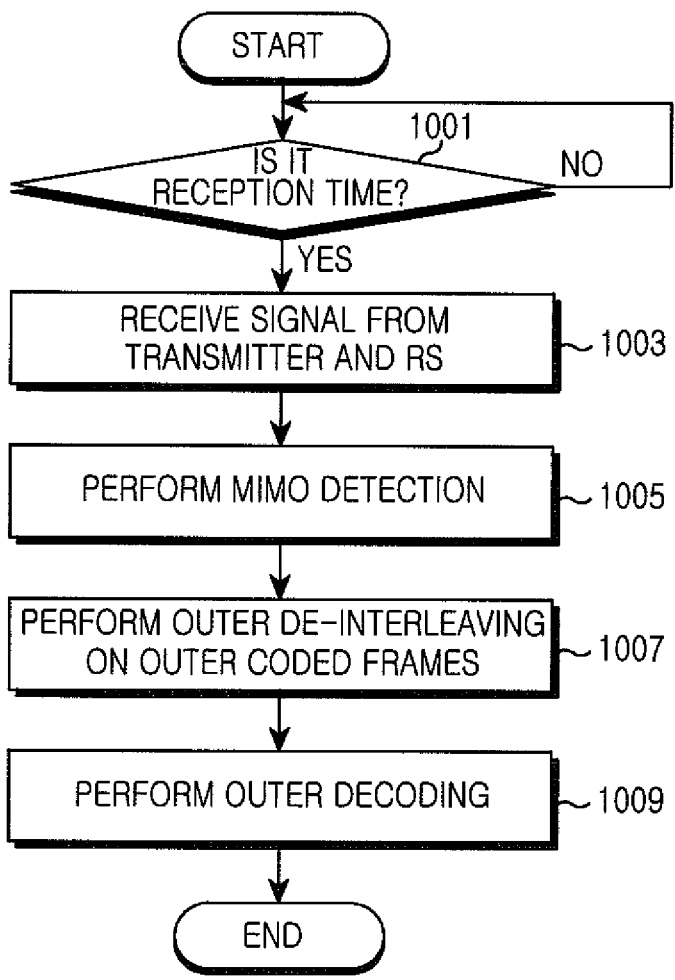
FIG. 10 is a flowchart illustrating an operation of a receiver in a multi-hop relay system according to an exemplary embodiment of the present invention.

FIG. 10 is a flowchart illustrating an operation of a receiver in a multi-hop relay system according to an exemplary embodiment the present invention.

Referring to FIG. 10, in step 1001, it is determined whether a reception time has arrived. If it is the reception time, in step 1003 a signal is received from a transmitter and at least one RS. In step 1005, the received signal is demodulated by performing MIMO detection, thereby detecting a plurality of outer coded frames.

In step 1007, the detected outer coded frames are joined, and symbols are restored to their original positions by de-interleaving in an inverse manner with respect to an outer interleaving process performed in the transmitter. In step 1009, the outer de-interleaved data is decoded in an inverse manner with respect to an outer coding performed in the transmitter, and thus the data transmitted from the transmitter is restored.

As described above, an exemplary embodiment of the present invention proposes distributed spatial multiplexing in which a transmitter transmits different frames to N−1 RSs, and the transmitter and the N−1 RSs (or N−K RSs) simultaneously transmit different frames to a receiver. As such, a maximum N times of throughput can be obtained by using the distributed spatial multiplexing, resulting in the provision of the same throughput as direct transmission. Furthermore, according to an exemplary embodiment the present invention, transmission information can be arrived to the receiver via several paths by using a hierarchical frame structure, and thus a distributed spatial diversity effect can be provided.

Now, an exemplary implementation of the present invention will be described for better understanding of the invention.

Figure 11:
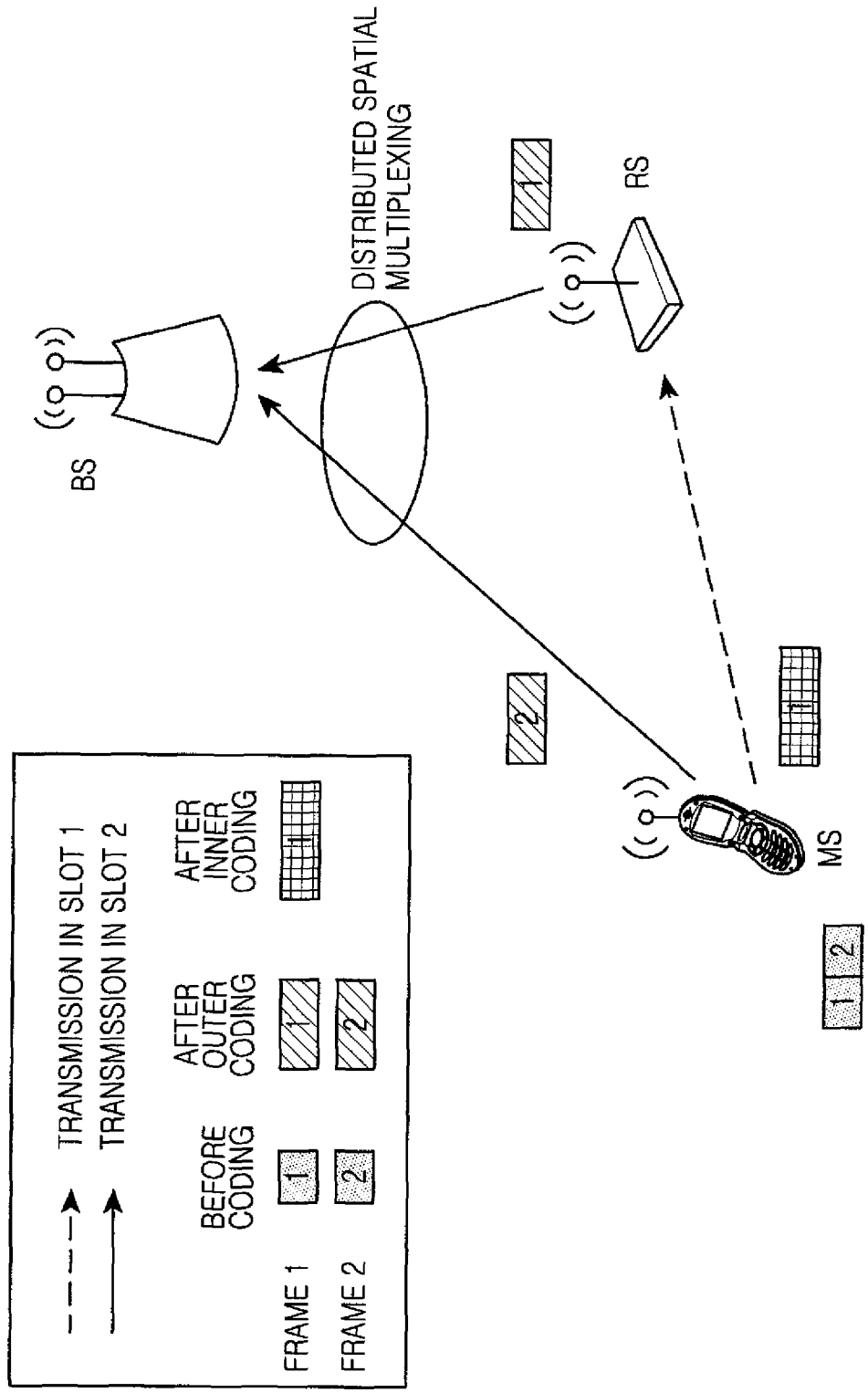
FIG. 11 is a view illustrating a scenario when one RS is installed between a Mobile Station (MS, transmitter) and a Base Station (BS, receiver) in an Up Link (UL) channel of a cellular system according to an exemplary embodiment of the present invention.

FIG. 11 is a view illustrating a scenario when one RS is installed between an MS (transmitter) and a BS (receiver) in an Up Link (UL) channel of a cellular system according to an exemplary embodiment of the present invention.

Referring to FIG. 11, the transmitter (i.e., MS) and the RS each include one transmit antenna, and the receiver (i.e., BS) includes two receive antennas. In a slot 1, the MS transmits an outer and inner coded frame 1 to the RS. In a slot 2, the MS transmits an outer coded frame 2 to the BS, and at the same time, the RS transmits to the BS the outer coded frame 1 which is reconfigured after received in the slot 1. Therefore, in the slot 2, a 2×2 MIMO environment is created by using the two transmit antennas of the MS and the RS and the two receive antennas of the BS. That is, in the slot 2, the receiver (BS) detects two different frames by using maximum likelihood detection or the like, decodes an outer coded frame, and restores the two frames transmitted by the MS.

Figure 12:
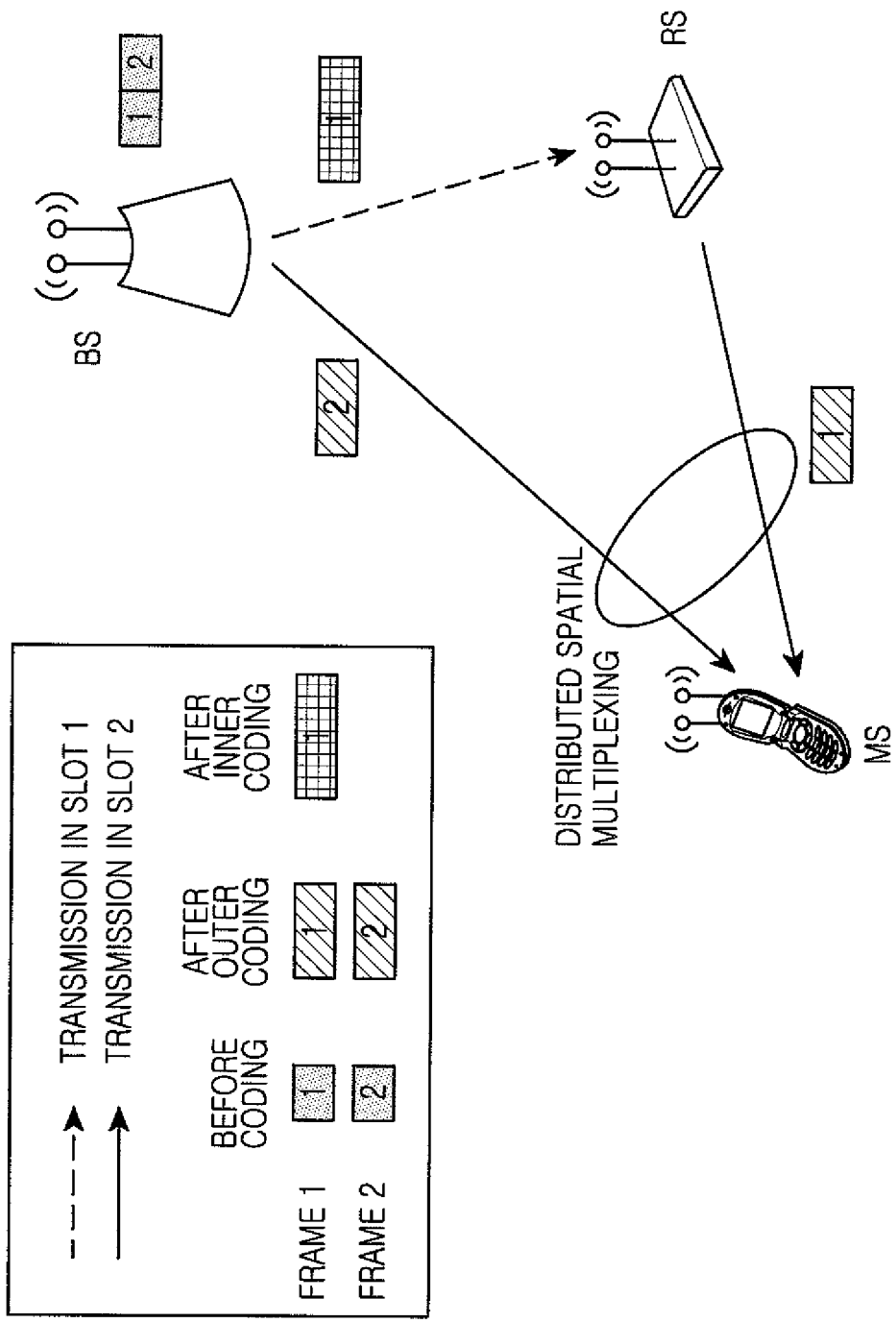
FIG. 12 is a view illustrating a scenario when one RS is installed between a BS (transmitter) and an MS (receiver) in a Down Link (DL) channel of a cellular system according to an exemplary embodiment of the present invention.

FIG. 12 is a view illustrating a scenario when one RS is installed between a BS (transmitter) and an MS (receiver) in a Down Link (DL) channel of a cellular system according to an exemplary embodiment of the present invention.

Referring to FIG. 12, the BS, the RS and the MS each include two antennas. In a slot 1, the BS transmits an outer and inner coded frame 1 to the RS, and the two transmit antennas of the BS and the two receive antennas of the RS are used to obtain a diversity gain. In a slot 2, the BS transmits an outer coded frame 2 to the MS, and at the same time, the RS transmits to the MS the outer coded frame 1 which is reconfigured after received in the slot 2. In this process, the BS and the RS each obtain a transmission diversity by using the two transmit antennas, and the MS detects different two frames by using maximum likelihood detection or the like. The detected two frames are outer-decoded, and thus the two frames transmitted by the BS are restored.

FIG. 13 is a view illustrating a scenario when two RSs are installed between an MS (transmitter) and a BS (receiver) in an UL channel of a cellular system according to an exemplary embodiment of the present invention.

Referring to FIG. 13, the BS has four antennas, an RS 1 has two antennas, an RS 2 has one antenna, and the MS has two antennas. The MS simultaneously transmits outer and inner coded frames 1 and 2 to the RS 1 using spatial multiplexing in a slot 1, and transmits an outer and inner coded frame 3 to the RS 2 in a slot 2. In a slot 3, the RS 1 transmits to the BS the outer coded frames 1 and 2 which are reconfigured after received in the previous slot, and at the same time, the RS 2 transmits to the BS the outer coded frame 3 which is reconfigured after received in the previous slot. Meanwhile, in the slot 3, the MS transmits no signal, and the BS detects three different frames by using maximum likelihood detection or the like when receiving signals from the RS 1 and the RS 2 via the four antennas. The detected three frames are outer decoded, and thus the three frames transmitted by the MS are restored. Although it has been assumed herein that the BS has four antennas, even when the number of antennas is 3, the three different frames received from the RS 1 and the RS 2 can also be restored by performing MIMO detection.

According to an exemplary embodiment of the present invention, there is an advantage in that distributed spatial multiplexing can be provided in a multi-hop relay communication system, and distributed spatial diversity can also be provided using hierarchical coding. That is, the same throughput as direct communication between a transmitter and a receiver can be provided, and a data error rate can be reduced using a diversity gain.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitter in a relay system, the transmitter comprising:
    an outer coder for performing outer coding on transmission data;
    an outer interleaver for interleaving data received from the outer coder;
    an inner coder for dividing data received from the outer interleaver into a plurality of frames and for performing inner coding on the divided frames; and
    a transmitting unit for transmitting each of different hierarchically coded frames received from the inner coder to a respective Relay Station (RS),
    wherein each of the different hierarchically coded frames is to be inner decoded by the respective RS and subsequently outer decoded by a receiver.

2. The transmitter of claim 1, wherein at least one frame of the divided frames is not inner coded by the inner coder and the transmitting unit transmits the at least one frame that is not inner coded to the receiver.

3. The transmitter of claim 1, wherein the transmitting unit comprises an inner interleaver for inner interleaving the hierarchically coded frames received from the inner coder.

4. The transmitter of claim 1, wherein the transmitting unit comprises:
    a modulator for modulating the hierarchically coded frames received from the inner coder;
    an Orthogonal Frequency Division Multiplexing (OFDM) modulator for performing OFDM modulation on data received from the modulator; and
    a Radio Frequency (RF) processor for performing RF processing on data received from the OFDM modulator.

5. The transmitter of claim 1, wherein the transmitting unit comprises:
    a modulator for modulating the hierarchically coded frames received from the inner coder;

a processor for performing multi-antenna signal processing on data received from the modulator and for generating a plurality of antenna signals;

a plurality of Orthogonal Frequency Division Multiplexing (OFDM) modulators for performing OFDM modulation on the plurality of antenna signals received from the processor; and a plurality of Radio Frequency (RF) processors for performing RF-processing on signals received from the OFDM modulators and for transmitting the resultant signals to respective antennas.

6. The transmitter of claim 1, wherein the transmitting unit transmits each of the different hierarchically coded frames to the corresponding RS at a different time period.

7. A Relay Station (RS) apparatus in a relay system, the apparatus comprising:

a receiving unit for receiving a hierarchically coded frame from a transmitter;

an inner decoder for decoding the hierarchically coded frame received from the receiving unit in an inverse manner with respect to an inner coding process performed in the transmitter and thereby detecting an outer coded frame; and a transmitting unit for transmitting the outer coded frame to a receiver at a time period, wherein the time period corresponds to a time when the transmitter and any other RSs each transmit a respective different outer coded frame to the receiver.

8. The apparatus of claim 7, wherein the receiving unit comprises:

a Radio Frequency (RF) processor for converting an RF signal received from the transmitter;

an Orthogonal Frequency Division Multiplexing (OFDM) demodulator for performing OFDM demodulation on data received from the RF processor; and a demodulator for demodulating data received from the OFDM demodulator.

9. The apparatus of claim 8, wherein the receiving unit further comprises an inner de-interleaver for de-interleaving data received from the demodulator in an inverse manner with respect to an inner interleaving process performed in the transmitter.

10. The apparatus of claim 7, wherein the transmitting unit comprises:

a buffer for storing the outer coded frame received from the inner decoder;

a modulator for modulating the outer coded frame stored in the buffer;

an Orthogonal Frequency Division Multiplexing (OFDM) modulator for performing OFDM modulation on data received from the modulator; and an RF processor for converting data received from the OFDM modulator into a Radio Frequency (RF) signal.

11. A communication method of a transmitter in a relay system, the method comprising:

performing outer coding on data to be transmitted;

performing outer interleaving on the outer coded data;

dividing the outer interleaved data into a plurality of frames;

performing inner coding on the divided frames; and transmitting each of different inner coded frames to a corresponding Relay Stations (RS), wherein each of the different inner coded frames is to be inner decoded by the respective RS and subsequently outer decoded by a receiver.

12. The method of claim 11, further comprising transmitting to the receiver at least one of the divided frames without performing inner coding.

13. The method of claim 11, wherein the transmitting of each of the different inner coded frames comprises performing inner interleaving on the inner coded frames.

14. The method of claim 11, wherein the transmitting of the inner coded frames comprises:

modulating the inner coded frames;

performing Orthogonal Frequency Division Multiplexing (OFDM) modulation on the modulated data;

converting the OFDM-modulated data into a Radio Frequency (RF) signal; and transmitting the converted RF signal.

15. The method of claim 11, wherein the transmitting of the inner coded frames comprises:

modulating the inner coded frames;

performing multi-antenna signal processing on the modulated data and generating a plurality of antenna signals;

performing Orthogonal Frequency Division Multiplexing (OFDM) modulation on the antenna signals; and converting the OFDM-modulated signals into Radio Frequency (RF) signals and transmitting the converted RF signals through a plurality of antennas.

16. The method of claim 11, wherein, in the transmitting of each of the different inner coded frames, each of the different inner coded frames are respectively transmitted to the corresponding RS at a different time period.

17. A communication method of a Relay Station (RS) in a relay system, the method comprising:

receiving a hierarchically coded frame from a transmitter;

decoding the hierarchically coded frame received in an inverse manner with respect to an inner coding process performed in the transmitter and thereby detecting an outer coded frame; and transmitting the outer coded frame to a receiver at a time period, wherein the time period corresponds to a time when the transmitter and any other RSs each transmit a respective different outer coded frame to the receiver.

18. The method of claim 17, wherein the receiving of the hierarchically coded frame comprises:

converting a Radio Frequency (RF) signal received from the transmitter;

performing Orthogonal Frequency Division Multiplexing (OFDM)-demodulation on the converted RF signal; and demodulating the OFDM demodulated data.

19. The method of claim 18, wherein the receiving of the hierarchically coded frame comprises de-interleaving the demodulated data in an inverse manner with respect to an inner interleaving process performed in the transmitter.

20. The method of claim 18, wherein the receiving of the hierarchically coded frame comprises demodulating the Orthogonal Frequency Division Multiplexing (OFDM)-demodulated data by performing Multiple Input Multiple Output (MIMO) detection.

21. The method of claim 17, wherein the transmitting of the outer coded frame comprises:

buffering the outer coded frame;

modulating the buffered frame;

performing Orthogonal Frequency Division Multiplexing (OFDM) modulation on the modulated data;

converting the OFDM-modulated data into a Radio Frequency (RF) signal; and transmitting the converted RF signal.

22. A communication method of a receiver in a relay system, the method comprising:

receiving a frame from a transmitter and a respective different frame from each of at least one Relay Station (RS) and joining the received frames to output one data block;

de-interleaving the data block in an inverse manner with respect to an interleaving process performed in the transmitter and thereby restoring positions of symbols; and decoding the de-interleaved data in an inverse manner with respect to a first coding process performed in the transmitter, wherein the respective different frame was previously decoded by each of the at least one RS in an inverse manner with respect to a second coding process performed in the transmitter.

23. The method of claim 22, wherein the number of frames received from the transmitter and the at least one RS is equal to or less than the number of antennas of the receiver.

24. The method of claim 22, wherein the receiving of the frames comprises:

converting Radio Frequency (RF) signals respectively received from a plurality of antennas into baseband signals;

performing Orthogonal Frequency Division Multiplexing (OFDM)-demodulation on the baseband signals;

detecting a plurality of frames by demodulating the OFDM-demodulated signals by performing Multiple Input Multiple Output (MIMO) detection;

joining the frames to generate one data stream; and demodulating the data stream.

25. The method of claim 22, further comprising descrambling the decoded data.

* * * * *